(12) United States Patent
Wee et al.

(10) Patent No.: US 11,186,521 B2
(45) Date of Patent: Nov. 30, 2021

(54) CONDUCTIVE CERAMIC COMPOSITION HAVING EXCELLENT ELECTRICAL CONDUCTIVITY

(71) Applicants: WINCE. CO., LTD., Ansan-si (KR); Seok Won Jeon, Yongin-si (KR); Sung Bok Wee, Incheon (KR)

(72) Inventors: Sung Bok Wee, Incheon (KR); Hyeon Cheol Oh, Incheon (KR); Hyung Bok Wee, Namyangju-si (KR); Sung Pell Wee, Namyangju-si (KR)

(73) Assignees: WINCE. CO., LTD., Ansan-si (KR); Seok Won Jeon, Yongin-si (KR); Sung Bok Wee, Incheon (KR)

( * ) Notice: Subject to any disclaimer, the term of this patent is extended or adjusted under 35 U.S.C. 154(b) by 0 days.

(21) Appl. No.: 16/560,515

(22) Filed: Sep. 4, 2019

(65) Prior Publication Data
US 2020/0002236 A1    Jan. 2, 2020

Related U.S. Application Data

(63) Continuation of application No. PCT/KR2018/002684, filed on Mar. 7, 2018.

(30) Foreign Application Priority Data

Mar. 7, 2017    (KR) .......................... 10-2017-0029120

(51) Int. Cl.
*H01B 1/24* (2006.01)
*C04B 35/00* (2006.01)
(Continued)

(52) U.S. Cl.
CPC .............. *C04B 35/58* (2013.01); *C04B 35/01* (2013.01); *C04B 35/56* (2013.01); *C04B 35/634* (2013.01);
(Continued)

(58) Field of Classification Search
CPC ... H01B 1/00; H01B 1/14; H01B 1/20; H01B 1/24; C09D 5/24; C04B 35/00; C04B 35/56; C04B 35/58; C04B 35/634
See application file for complete search history.

(56) References Cited

U.S. PATENT DOCUMENTS 4,120,829 A * 10/1978 Dulin .................... C04B 35/565
                                                  252/516
5,486,420 A *  1/1996 Nishihara ............. C09C 1/3081
                                                  428/405
(Continued)

FOREIGN PATENT DOCUMENTS

CN        101311217 A    11/2008
CN        105399417 A     3/2016
(Continued)

OTHER PUBLICATIONS

Lee et al "Preparation and characterization of surface modified silica nanoparticles with organo-silane compounds", Colloids and Durfaces A: Physiochemical and Engineering Aspects 384, (2011) 318-322.*

(Continued)

*Primary Examiner* — Mark Kopec
(74) *Attorney, Agent, or Firm* — Studebaker & Brackett PC

(57) ABSTRACT

One embodiment of the present invention provides a conductive ceramic composition comprising: conductive non-oxide ceramic particles; oxide ceramic particles electrostatically bonded or co-dispersed with the non-oxide ceramic particles; and a binder resin.

15 Claims, 10 Drawing Sheets
(7 of 10 Drawing Sheet(s) Filed in Color)

(51) Int. Cl.
   *C04B 35/58*    (2006.01)
   *C04B 35/01*    (2006.01)
   *C04B 35/56*    (2006.01)
   *C04B 35/634*   (2006.01)
   *C04B 40/00*    (2006.01)
   *C04B 41/00*    (2006.01)

(52) U.S. Cl.
   CPC ...... *C04B 40/0021* (2013.01); *C04B 41/0072* (2013.01); *H01B 1/24* (2013.01)

(56) References Cited

U.S. PATENT DOCUMENTS

| | | | | |
|---|---|---|---|---|
| 6,187,256 | B1 * | 2/2001 | Aslan | C04B 35/565 |
| | | | | 264/666 |
| 6,573,018 | B2 * | 6/2003 | Ishibashi | C09C 1/3081 |
| | | | | 430/108.2 |
| 6,734,250 | B2 * | 5/2004 | Azechi | C08K 3/08 |
| | | | | 252/511 |
| 8,859,035 | B1 * | 10/2014 | Leamon | B01J 23/8926 |
| | | | | 427/212 |
| 2001/0018482 | A1 * | 8/2001 | Azechi | H01B 1/22 |
| | | | | 524/439 |

FOREIGN PATENT DOCUMENTS

| | | | |
|---|---|---|---|
| JP | 2013-209252 A | | 10/2013 |
| KR | 10-2017-0006454 A | | 1/2017 |
| KR | 10-2017-0006485 A | | 1/2017 |
| WO | WO 2012/086588 A1 | * | 6/2012 |

OTHER PUBLICATIONS

Caruso, "Nanoengineering of particle surfaces", Advanced Materials, 2001, 13, No. 1, Jan. 5 (pp. 11-22).*

Boluk et al "Interfacial interactions and properties of filled polymers. II: dispersion of filler particles", Polymer Composites, Aug. 1989, vol. 10, No. 4, pp. 215-221.*

Saltiel et al "Indentification of the dispersion behavior of surface treated nanoscale powders", Journal of Nanoparticle Research 6: 35-46, 2004.*

Kulig et al "Surface chemistry and suspension stability of oxide-nitride powder mixtures", Journal of Materials Science 26 (1991) 216-224.*

International Search Report issued in PCT/KR2018/002684; dated Jul. 17, 2018.

Office Action issued in KR 10-2017-0029120; mailed by the Korean Intellectual Property Office dated Sep. 11, 2017.

* cited by examiner

CONDUCTIVE CERAMIC COMPOSITION HAVING EXCELLENT ELECTRICAL CONDUCTIVITY

CROSS-REFERENCE TO RELATED APPLICATIONS

This application is a Continuation of International Application No. PCT/KR2018/002684 filed Mar. 7, 2018, which claims benefit of priority to Korean Patent Application No. 10-2017-0029120 filed Mar. 7, 2017, the entire content of which is incorporated herein by reference.

TECHNICAL FIELD

The present invention relates to a conductive ceramic composition having excellent electrical conductivity.

BACKGROUND ART

In modern quantum mechanics, it has been found that when the particle size of a material is reduced to a micrometer or nanometer level, the same material can also have qualitatively unique properties, and therefore, it has been defined that the particle size of the material can be a control variable affecting the qualitative properties.

Particularly, in recent years, nano meter-scale ceramic particle materials are widely used in various fields, and the possibility of applying the materials is also increasing. Particularly, as interest in biotechnology (BT) fields such as biotechnology, medicine, etc. has increased, studies related to the synthesis, functionalization and application of ceramic particles are being actively conducted.

For example, taking into consideration parameters such as the physicochemical properties or colloidal stability of ceramic particles and biological applicability, attempts have been continuously made to apply ceramic particles in the pharmaceutical or biomedical field. In addition, since the intensification and extinction of magnetism of high-magnetic field-sensitive ceramic particles made through surface modification may be modulated according to the presence of the magnetic field, and a specific bond to a target site may be induced, the particles may be used as a bio-friendly electromagnetic shielding material.

Electromagnetic shielding means that the specific part of a space is surrounded by a conductor or ferromagnetic material to prevent the inside from being affected by an external electromagnetic field, or vice versa.

Recently, in the GHz high-frequency range, there is a continuous demand for the development of electromagnetic shielding/absorption composite materials and preparation techniques thereof, which solve problems such as the malfunction of devices due to electromagnetic interference in IT and automotive electronics, the generation of electromagnetic waves harmful to the human body, and defense stealth technology.

Except well-known conductive materials such as graphene, graphite, a carbon nanotube (CNT), etc., since ordinary ceramic particles have semiconductor properties, they do not exhibit excellent properties in electrical conductivity and a low-resistant electrical property. Therefore, studies on conductive ceramic particles are continuously required.

In addition, dispersity in a medium is very important to widen the application range of ceramic particles. This is because, if the dispersity of the ceramic particles is not maintained at a predetermined level or more, particle size-specific physical properties may be lost due to the acceleration of the aggregation or clustering of particles. Particularly, in order to be used as a contrast agent injected into a living body, the particle size distribution must be uniform, and the dispersity between particles should also increase. In addition, there is a need for technology that can improve the dispersity of such ceramic particles, inhibit aggregation and prepare the particles in a large amount.

Therefore, a variety of studies related to surface treatment of ceramic particles using a hydrophobic silicate such as tetraethylorthosilicate (TEOS) or tetramethoxysilane (TMOS) have been conducted. Even though a silica coating inhibits aggregation between particles to maintain electrical properties, since the silica coating may result in decreases in mass productivity and magnetization ability, there is a problem in that the sensitivity of the sensor can be greatly reduced when being applied to the field of a sensor such as a biosensor.

For this reason, there is a need for conductive ceramic particles having high dispersity and excellent electrical conductivity.

Technical Problem

To solve the above-described problems of the prior art, the present invention is directed to providing conductive ceramic particles having excellent dispersity in a solvent, physical and chemical stabilities, and electrical conductivity.

Technical Solution

In one aspect of the present invention, the present invention provides a conductive ceramic composition, which includes: non-oxide ceramic particles; oxide ceramic particles electrostatically bound or co-dispersed with the non-oxide ceramic particles; and a binder resin.

In one exemplary embodiment, the non-oxide ceramic particles may be one selected from the group consisting of a metal component, Si, B, C, O, S, P, N and a combination of two or more thereof.

In one exemplary embodiment, the metal component may be one selected from the group consisting of Sn, Ga, In, Tl, As, Pb, Cd, Ba, Ce, Co, Fe, Gd, La, Mo, Nb, Pr, Sr, Ta, Ti, V, W, Y, Zr, Si, Sc, Ni, Al, Zn, Mg, Li, Ge, Rb, K, Hf, Cr, and a combination of two or more thereof.

In one exemplary embodiment, the surface treatment may be chemical surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof.

In one exemplary embodiment, the surface treatment may be physical or physicochemical surface treatment with one selected from the group consisting of heat, plasma, ultrasonic waves, milling, and a combination of two or more thereof.

In one exemplary embodiment, the non-oxide ceramic particles may further include one selected from the group consisting of a metal flake, a metal rod, metal powder, carbon black, graphene, a carbon nanotube, a fullerene, and a combination of two or more thereof.

In one exemplary embodiment, the non-oxide ceramic particles may have a size of 1 to 20,000 nm.

In one exemplary embodiment, the non-oxide ceramic particles may be prepared in one shape selected from the group consisting of a rod shape, a spherical shape, a square shape, a flake shape, and a combination of two or more thereof.

In one exemplary embodiment, the oxide ceramic particles may consist of a metal component and O.

In one exemplary embodiment, the oxide ceramic particles may be subjected to surface treatment.

In one exemplary embodiment, the surface treatment may be chemical surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof.

In one exemplary embodiment, the surface treatment may be physical or physicochemical surface treatment with one selected from the group consisting of heat, plasma, ultrasonic waves, milling, and a combination of two or more thereof.

In one exemplary embodiment, the oxide ceramic particles may have a size of 1 to 20,000 nm.

In one exemplary embodiment, the binder resin may be one selected from the group consisting of an organic binder, an inorganic binder, a cationic polymer, an anionic polymer, a non-ionic polymer, an amphiphilic polymer, and a combination of two or more thereof.

In one exemplary embodiment, the oxide ceramic particles may further include one selected from the group consisting of a pigment, a dye, a curing agent, a charge control agent, an electrolyte, a dispersing agent and a combination of two or more thereof.

Advantageous Effects

According to an aspect of the present invention, a conductive ceramic composition having excellent dispersity and electrical conductivity, in which oxide ceramic particles are electrostatically bound or co-dispersed with non-oxide ceramic particles in a binder resin, can be provided.

The effects of the present invention are not limited to the above-described effects, and should be understood to include all the effects which can be deduced from the configuration of the present invention described in the detailed description or claims of the present invention.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
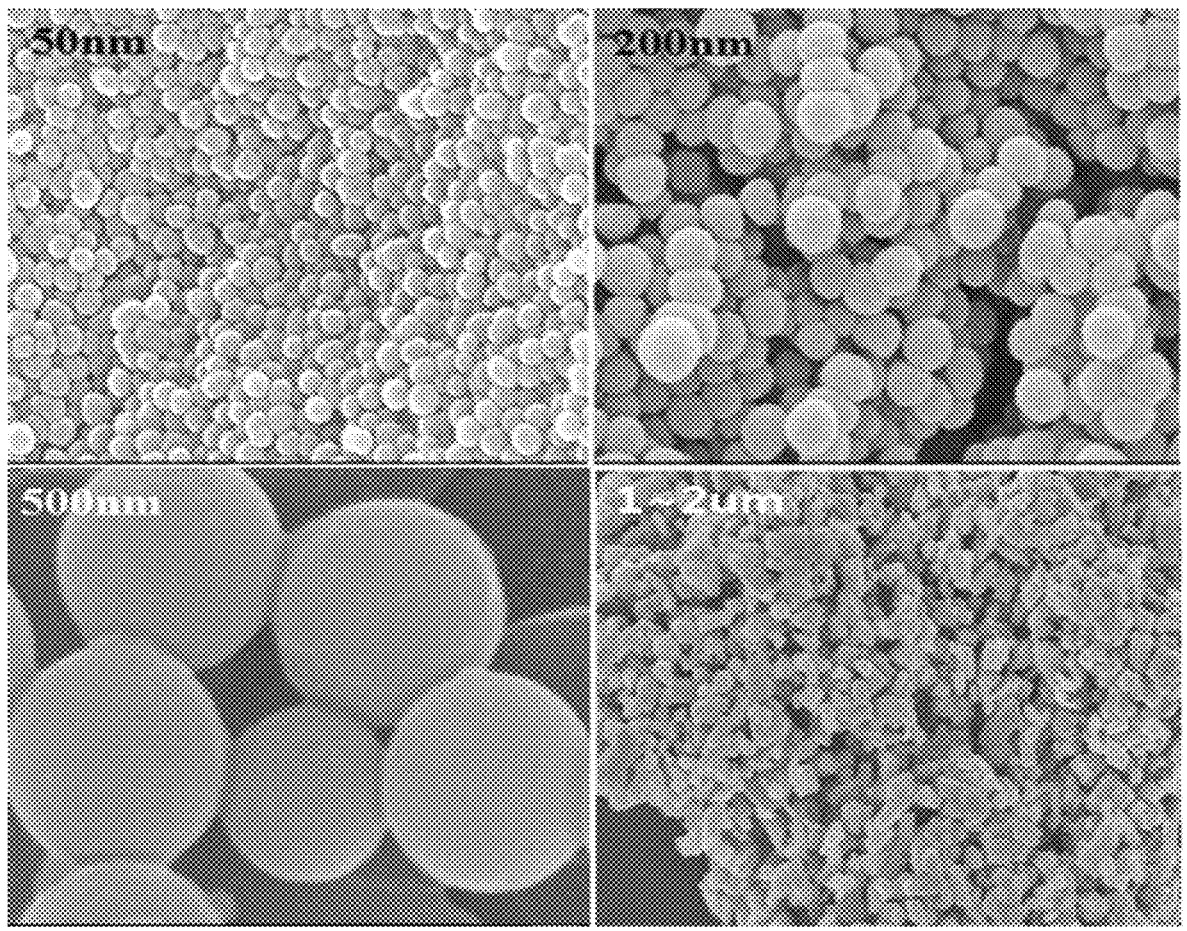
FIG. 1 shows the results of SEM analysis of non-oxide ceramic compositions having various sizes and shapes of the present invention.

Hereinafter, the present invention will be described with reference to drawings. However, the present invention may be embodied in a variety of different shapes, and thus the present invention is not limited to the following examples.

Throughout the specification, when a part is "connected" to another part, it means that one part is not only "directly connected", but also "indirectly connected" via another member to another part. In addition, when one part "includes" one component, this means that, unless particularly described otherwise, another component may be further included, rather than excluding the other component.

One exemplary embodiment of the present invention provides a conductive ceramic composition, which includes: non-oxide ceramic particles; oxide ceramic particles electrostatically bound or co-dispersed with the non-oxide ceramic particles; and a binder resin.

The term "non-oxide ceramic particles" used herein may be interpreted to include ceramic particles, e.g., SiAlON, in which an oxygen (O) element is included in a molecular structure or crystal structure, not at a terminal thereof, as well as ceramic particles not including an oxygen (O) element.

The non-oxide ceramic particles may be one selected from a metal component, Si, B, C, O, S, P, N, and a combination of two or more thereof, but the present invention is not limited thereto.

The metal component may be one selected from the group consisting of Sn, Ga, In, Tl, As, Pb, Cd, Ba, Ce, Co, Fe, Gd, La, Mo, Nb, Pr, Sr, Ta, Ti, V, W, Y, Zr, Si, Sc, Ni, Al, Zn, Mg, Li, Ge, Rb, K, Hf, Cr, and a combination of two or more thereof, but the present invention is not limited thereto.

While the carbon series including graphene, graphite, a carbon nanotube (CNT), etc. has exceptionally high electrical conductivity, general ceramic particles have semiconductor properties and thus do not exhibit excellent properties in electrical characteristics such as electrical conductivity and low resistance. Therefore, non-oxide ceramic particles consisting of a metal having excellent electrical conductivity and one selected from the group consisting of Si, B, C, O, S, P, N and a combination of two or more thereof, and preferably, Si, B, C or N as components were synthesized. The non-oxide ceramic particles may be one selected from the group consisting of one selected from the group consisting of boride ceramics, carbide ceramics, nitride ceramics, silicide ceramics and a combination of two or more thereof, but the present invention is not limited thereto.

The boride ceramics may be $BaB_6$, $CeB_6$, $Co_2B$, $CoB$, $FeB$, $GdB_4$, $GdB_6$, $LaB_4$, $LaB_6$, $Mo_2B$, $MoB$, $MoB_2$, $Mo_2B_5$, $Nb_3B_2$, $NbB$, $Nb_3B_4$, $NbB_2$, $NdB_4$, $NdB_6$, $PrB_4$, $PrB_6$, $SrB_6$, $TaB$, $TaB_2$, $TiB$, $TiB_2$, $VB$, $VB_2$, $W_2B_5$, $YB_4$, $YB_6$, $YB_{12}$, $ZrB_2$ or a combination of two or more thereof, the carbide ceramics may be $MoC$, $Mo_2C$, $Nb_2C$, $NbC$, $Ta_2C$, $TaC$, $TiC$, $V_2C$, $VC$, $B_4C$, $WC$, $W_2C$, $ZrC$ or a combination of two or more thereof, the nitride ceramics may be $Mo_2N$, $Nb_2N$, $NbN$, $ScN$, $Ta_2N$, $TiN$, $ZrN$, $SiAlON$ or a combination of two or more thereof, and the silicide ceramics may be $CoSi_2$, $Mo_3Si$, $Mo_5Si_3$, $MoSi_2$, $NbSi_2$, $Ni_2Si$, $Ta_2Si$, $TaSi_2$, $TiSi$, $TiSi_2$, $V_5Si_3$, $VSi_2$, $W_3Si$, $WSi_2$, $ZrSi$, $ZrSi_2$ or a combination of two or more thereof, but the present invention is not limited thereto.

The surface treatment may be chemical surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof.

The acid treatment may be performed by one selected from the group consisting of nitric acid, sulfuric acid, acetic acid, hydrochloric acid and a combination of two or more thereof, but the present invention is not limited thereto. The base treatment may be performed by one selected from the group consisting of ammonia, potassium hydroxide, calcium hydroxide, magnesium hydroxide, sodium hydroxide and a combination of two or more thereof, but the present invention is not limited thereto.

When the non-oxide ceramic particles are treated with an acid or base, a positive charge or negative charge may be provided to the non-oxide ceramic particles by an isoelectric point (IEP) change. Here, a positive charge is provided at pH 3 to 5, and preferably, pH 3 to 3.5, and a negative charge is provided at pH 4 to 10, and preferably, pH 7 to 10. As the non-oxide ceramic particles are surrounded by $H^+$ under an acidic atmosphere, overall, the particles tend to have a positive charge, and as the non-oxide ceramic particles are surrounded by $OH^-$ under a basic atmosphere, overall, the particles tend to have a negative charge.

The non-oxide ceramic particles may be subjected to surface treatment using one selected from the group consisting of a halogen element, a silane-based compound, a polymer, a metal ionic material, carbamic acid and a combination of two or more thereof.

The halogen element may be selected from the group consisting of F, Cl, B, I and a combination of two or more thereof, and the silane-based compound may be, but not limited to, aminopropyltrimethoxysilane.

When the non-oxide ceramic particles are subjected to surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof, the surface of the non-oxide ceramic particles has a low energy barrier that can be electrically activated.

For example, when a semiconductor is manufactured, a P- or N-type semiconductor is used. When there are many free electrons, the semiconductor is called an N-type semiconductor, and on the other hand, when a hole density is higher than a free electron density, the semiconductor is called a P-type semiconductor. As such, surface treatment performed by providing a functional group to the surface of the non-oxide ceramic particles may increase the amount of electrons or holes, thereby modifying the mobility of the electrons and lowering the surface resistance of a substrate or increasing electrical conductivity due to smooth charge transfer with another material present adjacent to the above-mentioned semiconductor, resulting in improvement in electromagnetic ability.

Other than the surface treatment, a UV-ozone generator, plasma, heat, ultrasonication, or two or more methods thereof, and preferably, heat or ultrasonication, may be additionally performed, but the present invention is not limited thereto.

The treatment using a UV-ozone generator may be performed to remove contaminants from the surface of non-oxide ceramic particles and modify the surface. Here, the treatment time may be approximately 1 to 4 hours, and preferably, 2 to 3 hours, but the present invention is not limited thereto. When the treatment time is less than 1 hour, it is difficult to remove contaminants from the surface of non-oxide ceramic particles, and particularly, it is not efficient in removing organic contaminants, and it is difficult to provide sufficient hydrophilicity, and when the treatment time exceeds 4 hours, process efficiency may be reduced.

In the treatment using a UV-ozone generator, a distance between a light source and a specimen, that is, an irradiation distance, may be 5 to 30 mm, and preferably, 15 to 25 mm, but the present invention is not limited thereto. When the irradiation distance is less than 5 mm, UV-ozone and non-oxide ceramic particles are excessively close to each other, thereby generating a problem of random destruction of the surface of the non-oxide ceramic particles, and when the irradiation distance is more than 30 mm, because of an excessively large irradiation distance, there is a problem in that it is difficult to remove contaminants and impart hydrophilicity.

The wavelength of UV-ozone generation may range from 185 to 254 nm, and preferably, 254 nm, but the present invention is not limited thereto. When the wavelength of UV-ozone generation is 185 nm, the organic contaminants which may be present on the surface of the non-oxide ceramic particles may be decomposed into hydrogen and carbon, and when the wavelength of UV-ozone generation is 254 nm, ozone is generated from an oxygen molecule and binds to hydrogen and carbon provided from the organic material, thereby removing the organic material, and imparting hydrophilicity to the surface of the non-oxide ceramic particles.

The surface treatment may be physical or physicochemical surface treatment with one selected from the group consisting of heat, plasma, ultrasonic waves, milling, and a combination of two or more thereof.

In the plasma treatment, different from a general gas, a plasma gas may be a mixture of ions, electrons, atoms and molecules and have very high energy, thereby modifying the material surface, and generate radicals using electrical discharging under an ambient atmospheric pressure, thereby imparting hydrophilicity to the surface of the non-oxide ceramic particles.

The thermal treatment may be performed at 30 to 300° C., and preferably, 60 to 90° C., but the present invention is not limited thereto. When the thermal treatment temperature is less than 30° C., the surface treatment of the non-oxide ceramic particles may not be sufficiently performed, and when the thermal treatment temperature is more than 300° C., the surface of the non-oxide ceramic particles may be oxidized due to a high temperature.

The ultrasonication may induce three representative physical phenomena of fluid cavitation, local heating, formation of free radicals. The fluid cavitation may induce dispersion of the non-oxide ceramic particles and functional groups due to bubble generation and a force caused by an explosion. In addition, local heating occurs due to the supply of high energy, and is effective for removal of impurities strongly adhered to the surface of the non-oxide ceramic particles because of the formation of free radicals.

The ultrasonication may be performed for 30 to 150 minutes, and preferably, 50 to 70 minutes, but the present invention is not limited thereto. When the ultrasonication time is less than 30 minutes, it may not be sufficient to remove impurities from the surface of the non-oxide ceramic particles or modify the surface, and when the ultrasonication time is more than 150 minutes, the surface of the non-oxide ceramic particles may be damaged due to high energy application.

The milling treatment may be performed by a wet method, a dry method or a combination of wet and dry methods. Through the milling treatment, it is possible to grind non-oxide ceramic particles such that they have a uniform particle size and increase the reactivity of the surface of the ceramic particles by surface friction between the particles.

The non-oxide ceramic particles may further include one selected from the group consisting of a metal flake, a metal rod, metal powder, carbon black, graphene, a carbon nanotube, a fullerene and a combination of two or more thereof, but the present invention is not limited thereto. Generally, metal particles are often used as a conductive material, for example, for electromagnetic shielding, but the density of metal particles is high, and corrosion is easily caused by an acid, air, moisture, brine, etc. The non-oxide ceramic particles have lower thermal conductivity or electrical conductivity, but have higher durability to the external environment than metals. Therefore, both types of particles may be used simultaneously for the synergistic effect of the durability of the non-oxide ceramic particles and the electrical conductivity and thermal conductivity of the metal particles.

The non-oxide ceramic particles may have a size of 1 to 20,000 nm, and preferably, 50 to 15,000 nm, but the present invention is not limited thereto. When the size of the non-oxide ceramic particles is less than 1 nm, it may be difficult to prepare nanometer-scale particles, and when the size of the non-oxide ceramic particles is more than 20,000 nm, the surface area of the particles is reduced, and thus performance such as electrical conductivity and thermal conductivity may be degraded, and binding to oxide ceramic particles may be reduced.

The non-oxide ceramic particles may be prepared in one shape selected from the group consisting of a rod shape, a spherical shape, a square shape, a flask shape and a combination of two or more thereof, and preferably, a spherical shape, but the present invention is not limited thereto. The non-oxide ceramic particles may further include irregular star-shaped, trapezoidal, and octahedral particles. In addition, it will be understood that the shape of the non-oxide ceramic particles is not limited to the above examples, and includes a combination of two or more of rod, spherical, square and flake shapes, or a partially-modified shape, for example, hemispherical, ellipsoidal, hollow, rectangular, trapezoidal, rhomboidal, and parallelogram shapes. Referring to FIG. 1, the result of SEM analysis of the non-oxide ceramic particles with various sizes and shapes may be confirmed.

The oxide ceramic particles may consist of a metal component and, and is preferably selected from the group consisting of $SiO_2$, $TiO_2$, $MgO$, $Al_2O_3$, $Fe_2O_3$, $Fe_3O_4$ and a combination of two or more thereof, but the present invention is not limited thereto.

The oxide ceramic particles may be surface-treated.

The surface treatment may be chemical surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof.

The surface treatment may further include physical milling. The milling treatment may be performed by a wet method, a dry method or a combination of dry and wet methods. Through the milling treatment, it may be possible to grind the oxide ceramic particles such that they have a uniform particle size, and increase the surface reactivity of the ceramic particles due to surface friction between the particles.

The acid treatment may be performed with one selected from the group consisting of nitric acid, sulfuric acid, acetic acid, hydrochloric acid, and a combination of two or more thereof, but the present invention is not limited thereto. The base treatment may be performed with one selected from the group consisting of ammonia, potassium hydroxide, calcium hydroxide, magnesium hydroxide, sodium hydroxide and a combination of two or more thereof, but the present invention is not limited thereto.

When the oxide ceramic particles are treated with an acid or base, the change in isoelectric point (IEP), a positive charge or negative charge may be provided to the oxide ceramic particles. Here, the positive charge may be imparted in the range of pH 2 to 5, and preferably, pH 2 to 3, and the negative charge may be imparted in the range of pH 5 to 10, and preferably, pH 7 to 10. When the oxide ceramic particles are surrounded by $H^+$ under an acidic atmosphere, the particles generally have a positive charge, and when the oxide ceramic particles are surrounded by $OH^-$ under a basic atmosphere, the particles generally have a negative charge.

The surface treatment of the oxide ceramic particles may be performed using one selected from the group consisting of a halogen atom, a silane-based compound, a polymer, a metal ionic material, carbamic acid and a combination of two or more thereof.

The halogen atom may be selected from the group consisting of F, Cl, B, I and a combination of two or more thereof, and the silane-based compound may be aminopropyltrimethoxysilane, but the present invention is not limited thereto.

When the surface treatment of the oxide ceramic particles is performed using one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof, the surface of the oxide ceramic particles has a low energy barrier that can be electrically activated.

As described in the surface treatment of the non-oxide ceramic particles, surface treatment performed by providing a functional group to the surface of the oxide ceramic particles may increase the amount of electrons or holes, thereby modifying the mobility of the electrons and lowering the surface resistance of a substrate or increasing electrical conductivity due to smooth charge transfer with another material present adjacent to the above-mentioned semiconductor, resulting in improvement in electromagnetic ability.

Here, the oxide ceramic particles undergoing the surface treatment to have an opposite charge to the non-oxide ceramic particles may bind to each other by electrostatic attraction. When both non-oxide ceramic particles having excellent electrical conductivity and oxide ceramic particles having an insulating property are used, an electric conductive path may be induced. That is, when the non-oxide ceramic particles and the ceramic particles are uniformly dispersed on a substrate surface without aggregation, or the oxide ceramic particles are electrostatically bound to the non-oxide ceramic particles, uniformly dispersed on a substrate and cohesively applied, current is induced to the non-oxide ceramic particles without passing through the oxide ceramic particles having an insulating property.

In addition, an electric conductive path capable of receiving electrons from non-oxide ceramic particles bonded by electrostatic attraction and transferring the electrons may be partially produced due to the change in an energy barrier through surface treatment of the oxide ceramic particles having an insulating property.

In contrast, oxide ceramic particles surface-treated to have the same charge as the non-oxide ceramic particles may be co-dispersed by electrostatic repulsion. In this case, the role of a binder resin to be described below is required. Since there is an electric conductive path is linked by means of a binder resin having a positive or negative charge, excellent electrical conductivity is exhibited. In addition, there is little aggregation between particles due to electrostatic repulsion, and the particles may be uniformly dispersed in the binder resin.

The oxide ceramic particles may have 1 to 20,000 nm, preferably 10 to 10,000 nm, and more preferably 10 to 5,000 nm, but the present invention is not limited thereto. When the size of the oxide ceramic particles is less than 1 nm, it may be difficult to prepare nano meter-scale particles, and when the size of the oxide ceramic particles is more than 20,000 nm, as the size of the oxide ceramic particles having an insulating property increases, the electrical conductivity of the conductive ceramic composition may be lowered.

The binder resin may be one selected from the group consisting of an organic binder, an inorganic binder, a cationic polymer, an anionic polymer, a non-ionic polymer, an amphiphilic polymer, and a combination of two or more thereof, and preferably, an acrylic polymer and an epoxy-based polymer, but the present invention is not limited thereto. The binder resin may serve as a solvent and a binder.

It is difficult for a polymer to serve as a conductive polymer used for electromagnetic shielding due to low electrical conductivity and high electrical resistance, and it only serves as a liquid solvent or vehicle. However, when the non-oxide ceramic particles and the oxide ceramic particles have the same surface charge, it may allow ceramic particles to be stably dispersed and help to facilitate electrical adsorption of an epoxy-based binder resin exhibiting a positive or negative charge or an acrylic binder resin exhibiting a positive or negative charge to a substrate to be attached.

Since the non-oxide ceramic particles and oxide ceramic particles are heterogeneous particles simultaneously applied to the conductive ceramic composition, high dispersibility of the heterogenous particles is important. When the dispersibility of the heterogenous particles is poor, that is, when those particles are randomly aggregated, the flow of electricity is disturbed, and the electricity is concentrated in one part, thereby generating an overcurrent phenomenon and increasing resistance. For these problems, by surface treatment of the oxide ceramic particles and the non-oxide ceramic particles, the affinity with the binder resin may be improved and thus dispersibility may increase.

The oxide ceramic particles may further include one selected from the group consisting of a pigment, a dye, a curing agent, a charge control agent, an electrolyte, a dispersing agent and a combination of two or more thereof. By adding a pigment to the oxide ceramic particles, conductive ceramic compositions having various colors may be provided.

The conductive ceramic composition may be applied to the surface of a substrate such as a plastic, glass or metal by dipping, spraying or coating. To apply the conductive ceramic composition onto the substrate, the conductive ceramic composition may be prepared in any one type of a slurry, paste, gel or film by adjusting the weight or volume ratio of a solvent and the conductive ceramic composition.

Meanwhile, in another aspect of the present invention, the present invention may provide a method of preparing a conductive ceramic composition, which includes: (a) surface-treating non-oxide ceramic particles; (b) dispersing the surface-treated non-oxide particles in an epoxy-based polymer solution; (c) surface-treating oxide ceramic particles; (d) dispersing the surface-treated oxide ceramic particles in an epoxy-based polymer solution; and (e) mixing the solution of step (d) with the solution of step (b), and additionally mixing and stirring a binder resin therewith.

Hereinafter, examples of the present invention will be described in detail with reference to drawings.

Example 1

(1) Surface Treatment of Non-Oxide Ceramic Particles 10 g of SiC powder and 100 mL of distilled water were added to a 1 L round bottom flask, and the resulting solution was stirred at a speed of 300 rpm using a stirrer. While stirring, the solution was titrated to pH 3 with 1N HCl using a pH meter. A heating mantle was pre-heated to 80° C., and the solution was heated therein while being stirred for 1 hour. Afterward, to remove a reaction filtrate, the surface-treated non-oxide ceramic particles were collected using a centrifuge at 30,000 rpm for 10 minutes. Subsequently, the particles were redispersed in a 50 mL epoxy solution.

(2) Surface Treatment of Oxide Ceramic Particles

A solution was prepared by adding 3 g of $SiO_2$ powder and 100 mg of distilled water to a 1 L round bottom flask and performing ultrasonication on the resulting mixture. The solution was stirred at a speed of 300 rpm, and titrated to pH 8.5 with 1N $NH_4OH$ using a pH meter. Afterward, stirring was maintained at room temperature for 1 hour. To remove a reaction filtrate, the surface-treated oxide ceramic particles were collected using a centrifuge at 30,000 rpm for 10 minutes. Afterward, the particles were redispersed in a 50 mL epoxy solution.

(3) Conductive Ceramic Composition

The solution obtained in step (2) was added to the solution obtained in step (1). Afterward, 100 mL of an epoxy binder solution and a curing agent were added to the resulting solution, and then dispersed through ultrasonication at room temperature for 2 hours.

Example 2

A conductive ceramic composition was obtained in the same manner as in Example 1, except that an acrylic binder solution was used in step (3) of Example 1.

Example 3

A conductive ceramic composition was obtained in the same manner as in Example 1, except that a solution was titrated to pH 10 with $NH_4OH$ in step (1) of Example 1.

Example 4

A conductive ceramic composition was obtained in the same manner as in Example 3, except that an acrylic binder solution was used in step (3) of Example 3.

Example 5

(1) Surface Treatment of Non-Oxide Ceramic Particles 10 g of SiC powder and 100 mL of distilled water were added to a 1 L round bottom flask, and stirred at a speed of 300 rpm using a stirrer. The solution was titrated to pH 10 with 1N HCl using a pH meter while being stirred. A heating mantle was pre-heated to 80□, and the solution was heated therein while being stirred for 1 hour. Afterward, to remove a reaction filtrate, the surface-treated non-oxide ceramic particles were collected using a centrifuge at 30,000 rpm for 10 minutes. Subsequently, the particles were redispersed in a 50 mL epoxy solution.

(2) Surface Treatment of Oxide Ceramic Particles

A solution was prepared by adding 3 g of $SiO_2$ powder and 100 mL of distilled water to a 1 L round bottom flask and performing ultrasonication on the resulting mixture. The solution was stirred at room temperature and 300 rpm for 30 minutes, and 5 mL of aminopropyltrimethoxysilane was slowly added. Stirring was maintained at room temperature for 3 hours. To remove a reaction filtrate, the surface-treated oxide ceramic particles were collected using a centrifuge at 30,000 rpm for 10 minutes. Afterward, the particles were redispersed in a 50 mL epoxy solution.

(3) Conductive Ceramic Composition

The solution obtained in step (2) was added to the solution obtained in step (1). Afterward, 300 mL of an acrylic binder solution and a curing agent were added to the resulting solution, and dispersed by ultrasonication at room temperature for 2 hours.

Example 6

A conductive ceramic composition was obtained in the same manner as in Example 5, except that a solution was titrated to pH 3 in step (1) of Example 5, and an epoxy binder solution was used in step (3).

Example 7

(1) Surface Treatment of Non-Oxide Ceramic Particles 10 g of SiC powder was put into a UV-ozone generator (Ozonecure 16, Minuta Technology Co. Ltd. Korea), and treatment was performed for 2 hours. Here, treatment conditions include an injection distance of 20 mm, an injection wavelength of 254 nm, and 120 W/cm². 10 g of UV-ozone treated SiC powder and 10 g of triethylenetetramine (TETA, Aldrich) were put into a vial and mixed. The mixture was dispersed by ultrasonication at 60° C. for 1 hour. Afterward, the resulting product was washed with ethanol (EtOH) and centrifuged at 30,000 rpm for 10 minutes, thereby obtaining a SiC precipitate in which a carboxyl group and an amine group are bound to each other. Afterward, the SiC precipitate was redispersed in a 50 mL epoxy solution.

(2) Surface Treatment of Oxide Ceramic Particles

A solution was prepared by adding 3 g of $SiO_2$ powder and 100 mL of distilled water to a 1 L round bottom flask and performing ultrasonication on the resulting mixture. The solution was stirred at room temperature and 300 rpm for 30 minutes, and 5 mL of aminopropyltrimethoxysilane was slowly added. Stirring was maintained at room temperature for 3 hours. To remove a reaction filtrate, the surface-treated oxide ceramic particles were collected using a centrifuge at 30,000 rpm for 10 minutes. Afterward, the particles were redispersed in a 50 mL epoxy solution (3) Conductive Ceramic Composition The solution obtained in step (2) was added to the solution obtained in step (1). Afterward, 100 mL of an acrylic binder solution and a curing agent were added, and then dispersed by ultrasonication at room temperature for 2 hours.

Example 8

A conductive ceramic composition was obtained in the same manner as in Example 7, except that an epoxy binder solution was used in step (3) of Example 7.

Examples 9 to 16

A conductive ceramic composition was obtained in the same manner as in Examples 1 to 8, except that $ZrB_2$ in step (1) and $TiO_2$ in step (2) of Examples 1 to 8 were used.

Example 17

(1) Surface treatment of non-oxide ceramic particles 10 g of SiC powder was washed with 200 mL of distilled water three times, and added to a mixed solvent in which distilled water and N-methyl pyrrolidone (NMP) were mixed in a volume ratio of 1:3. Subsequently, SiC particles were dispersed by 10-minute ultrasonication. A mixed solvent in which NMP and $NH_4OH$ were mixed in a volume ratio of 3:1 was prepared using a separate beaker, and added to the solution in which SiC particles were dispersed. The SiC particles were dispersed by applying ultrasonic waves at 80° C. for 30 minutes.

(2) Surface Treatment of Oxide Ceramic Particles

A solution was prepared by adding 3 g of $TiO_2$ powder and 100 mL of distilled water to a 1 L round bottom flask, and performing ultrasonication on the solution. The solution was stirred at a speed of 300 rpm, and titrated to pH 8.5 with 1N $NH_4OH$ using a pH meter. Afterward, stirring was maintained at room temperature for 1 hour. To remove a reaction filtrate, the surface-treated oxide ceramic particles were collected using a centrifuge at 30,000 rpm for 10 minutes. Afterward, the particles were redispersed in a 50 mL epoxy solution.

(3) Conductive Ceramic Composition

The solution obtained in step (2) was added to the solution obtained in step (1). Afterward, 100 mL of an epoxy binder solution and a curing agent were added, and then dispersed by ultrasonication at room temperature for 2 hours.

Example 18 (Preparation of Paste)

3 g of carboxymethylcellulose as a processing aid was mixed with the conductive ceramic composition prepared as described in each of Examples 1 to 17, and sufficiently dissolved. After the carboxymethylcellulose was completely dissolved, the solution was slowly cooled and then maintained at 10° C. for 30 minutes, thereby obtaining a conductive ceramic paste maintaining a gel state even at room temperature.

Examples 19 to 35

A conductive ceramic composition was obtained in the same manner as described in Examples 1 to 17, except that step (1) in each of Examples 1 to 17 was performed by the following method.

(1) Preparation of Solution of Non-Oxide Ceramic Particles 10 g of SiC powder and 100 mL of distilled water were added to a 1 L round bottom flask, and stirred at a speed of 300 rpm using a stirrer. Afterward, a 50 mL epoxy solution was added, and stirred at a speed of 300 rpm for 1 hour.

Comparative Example 1

(1) Preparation of Non-Oxide Ceramic Particles

A 50 mL epoxy solution was added to 10 g of SiC powder, and SiC particles were dispersed by ultrasonication.

(2) Preparation of Oxide Ceramic Particles

A 50 mL epoxy solution was added to 3 g of $SiO_2$ powder, and $SiO_2$ particles were dispersed by ultrasonication.

(3) Ceramic Composition

The solution obtained in step (2) was added to the solution obtained in step (1). Afterward, 100 mL of an epoxy solution was added, and particles were dispersed by ultrasonication at room temperature for 2 hours.

The non-oxide ceramic particles, the oxide ceramic particles and charges of the binder resins, which were used in Examples and Comparative Examples are summarized in Table 1.

(+): + charge, (−): − charge, (X): no charge

TABLE 1

| Classification | Non-oxide ceramic particles | Oxide ceramic particles | Binder resin |
|---|---|---|---|
| Comparative Example 1 | X | X | + |
| Examples 1 and 9 | + | − | + |
| Examples 2 and 10 | + | − | − |
| Examples 3 and 11 | − | − | + |
| Examples 4 and 12 | − | − | − |
| Examples 5 and 13 | − | + | − |
| Examples 6 and 14 | + | + | + |
| Examples 7 and 15 | + | + | − |
| Examples 8 and 16 | + | − | + |
| Example 17 | − | − | + |
| Examples 19 and 27 | X | − | + |
| Examples 20 and 28 | X | − | − |
| Examples 21 and 29 | X | − | + |
| Examples 22 and 30 | X | − | − |
| Examples 23 and 31 | X | + | − |
| Examples 24 and 32 | X | + | + |

TABLE 1-continued

| Classification | Non-oxide ceramic particles | Oxide ceramic particles | Binder resin |
|---|---|---|---|
| Examples 25 and 33 | X | + | − |
| Examples 26 and 34 | X | − | + |
| Example 35 | X | − | + |

Methods of analyzing the characteristics of the conductive ceramic compositions prepared in the examples and the comparative example are as follows.

Figure 2:
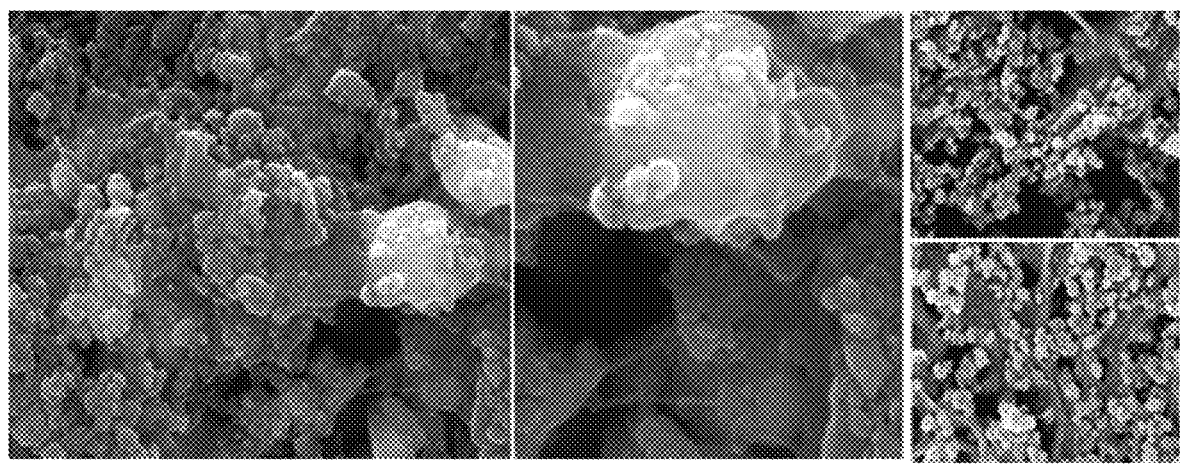
FIG. 2 shows the result of SEM analysis of a conductive ceramic composition binding to a binder resin according to an example of the present invention.

FIG. 2 shows the result of SEM analysis of the conductive ceramic compositions prepared through the Examples, which are bound to a binder resin.

Figure 3A:
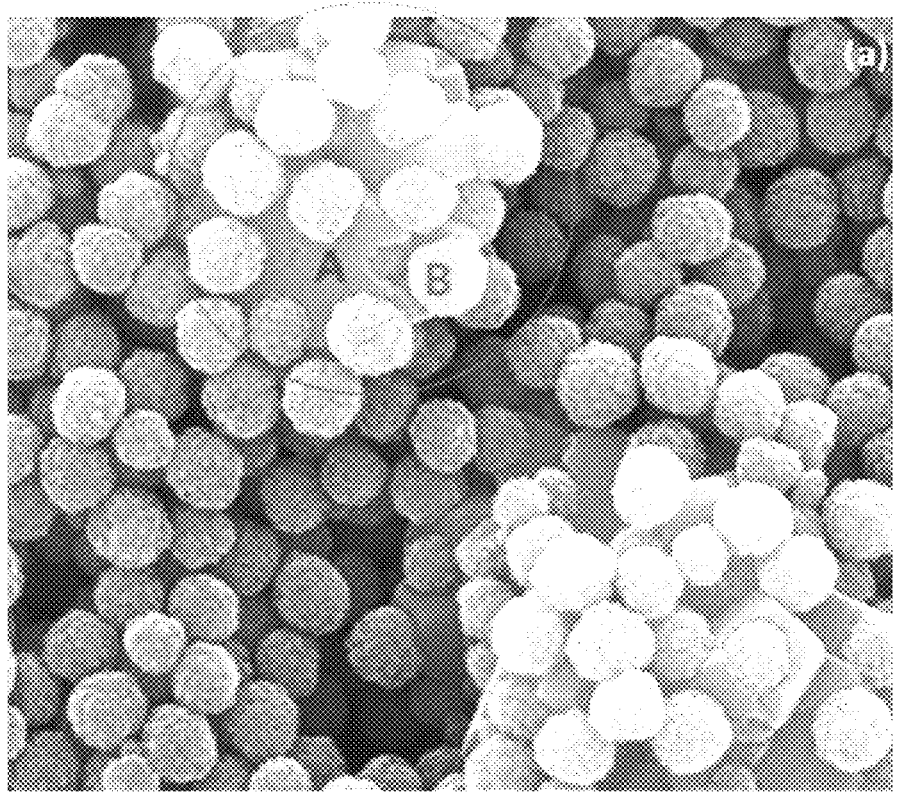
FIGS. 3A-3C show the results of SEM and EDX mapping analyses of a conductive ceramic composition according to an example of the present invention.
Figure 3B:
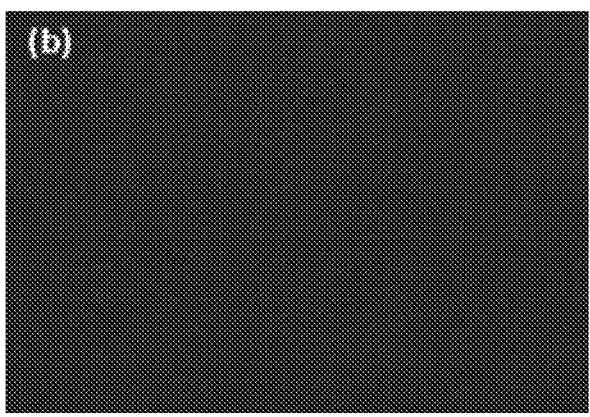
Figure 3C:
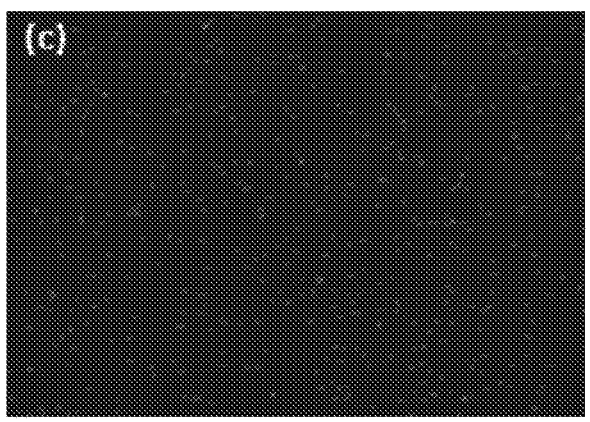

FIGS. 3A-3C show the results of SEM and EDX analyses of the conductive ceramic compositions prepared according to the examples. Referring in detail to FIG. 3A, it can be confirmed that oxide ceramic particles (B) are electrostatically bound to non-oxide ceramic particles (A). FIG. 3B shows the result of EDX mapping of non-oxide ceramic particles, and FIG. 3C shows the result of EDX mapping of oxide ceramic particles. Overall, it can be confirmed that oxide ceramic particles are distributed on non-oxide ceramic particles.

Figure 4A:
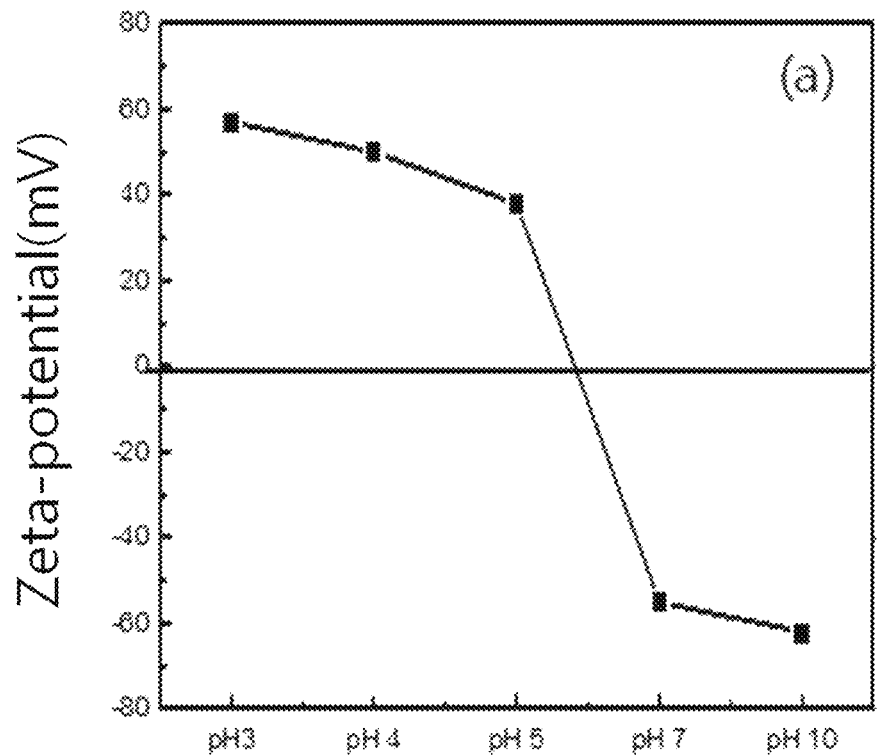
FIGS. 4A and 4B show the result of measuring a pH-dependent zeta potential value of non-oxide ceramic particles in a conductive ceramic composition according to an example of the present invention.
Figure 4B:
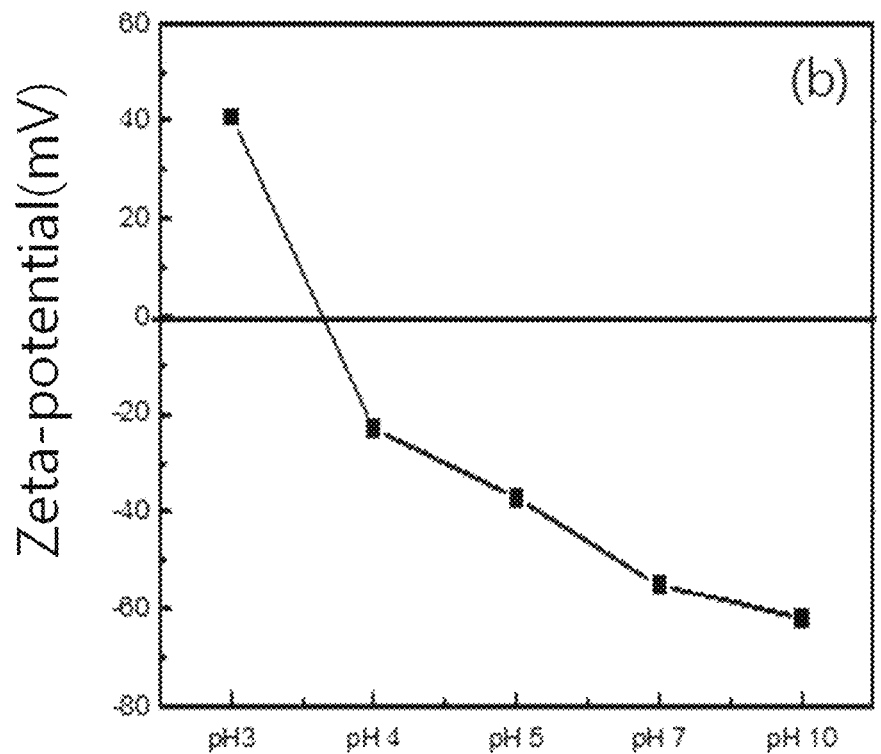

FIGS. 4A and 4B show the result of measuring zeta potentials of non-oxide ceramic particles according to pH. FIG. 4A shows the zeta potential of SiC particles according to pH. It can be seen that SiC particles exhibit a positive charge of approximately 40 to 60 mV in a range of pH 3 to 5. FIG. 4B shows the zeta potential of $ZrB_2$ particles according to pH. It can be seen that $ZrB_2$ particles exhibited a positive charge of approximately 40 mV only at pH 3, and exhibited a negative charge of approximately −20 to −60 mV in a range of pH 4 to 10.

Figure 5A:
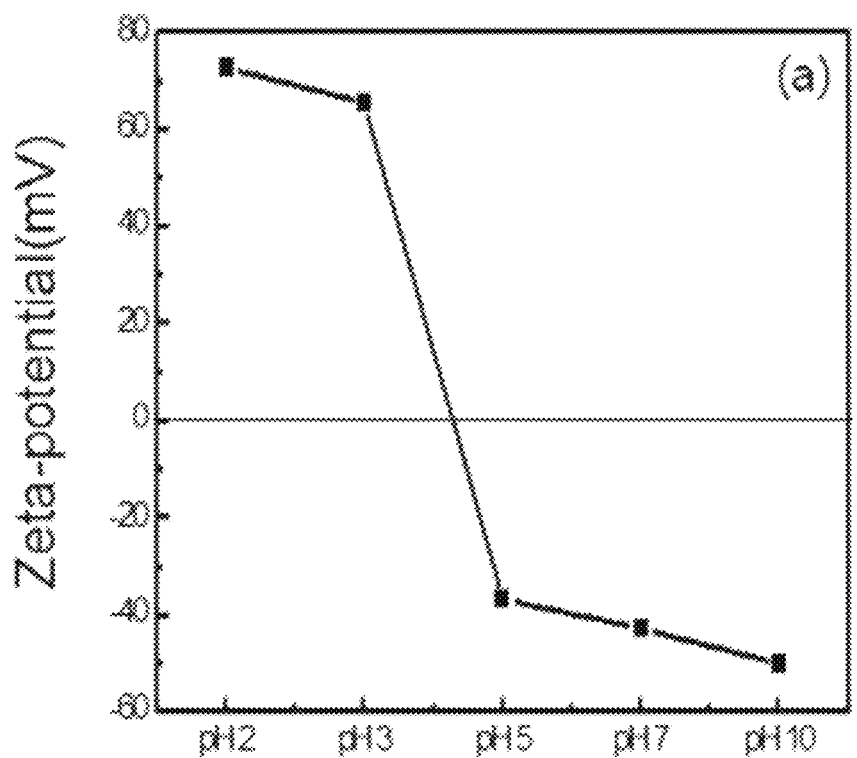
FIGS. 5A and 5B show the result of measuring a pH-dependent zeta potential value of oxide ceramic particles in a conductive ceramic composition according to an example of the present invention.
Figure 5B:
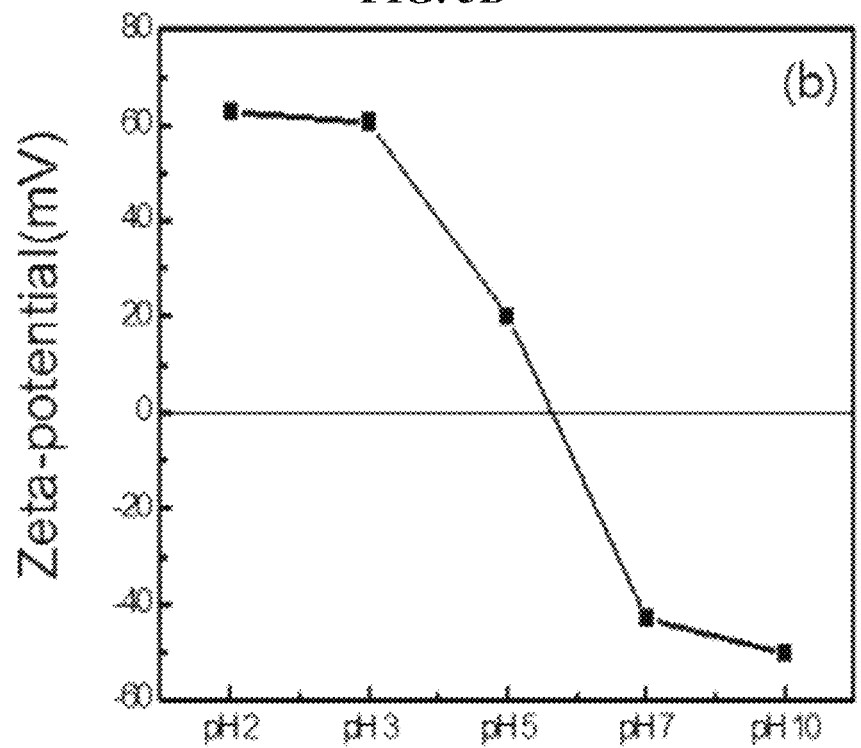

FIGS. 5A and 5B show the result of measuring a pH-dependent zeta potential of oxide ceramic particles. FIG. 5A shows the pH-dependent zeta potential of $SiO_2$ particles. It can be seen that $SiO_2$ particles exhibited a positive charge of approximately 60 to 70 mV in a range of pH 2 to 3. FIG. 5B shows the pH-dependent zeta potential of $TiO_2$ particles. It can be seen that $TiO_2$ particles exhibited a positive charge of approximately 10 to 60 mV in a range of pH 2 to 5, and a negative charge of approximately −40 to −60 mV in a range of pH 7 to 10.

Figure 6A:
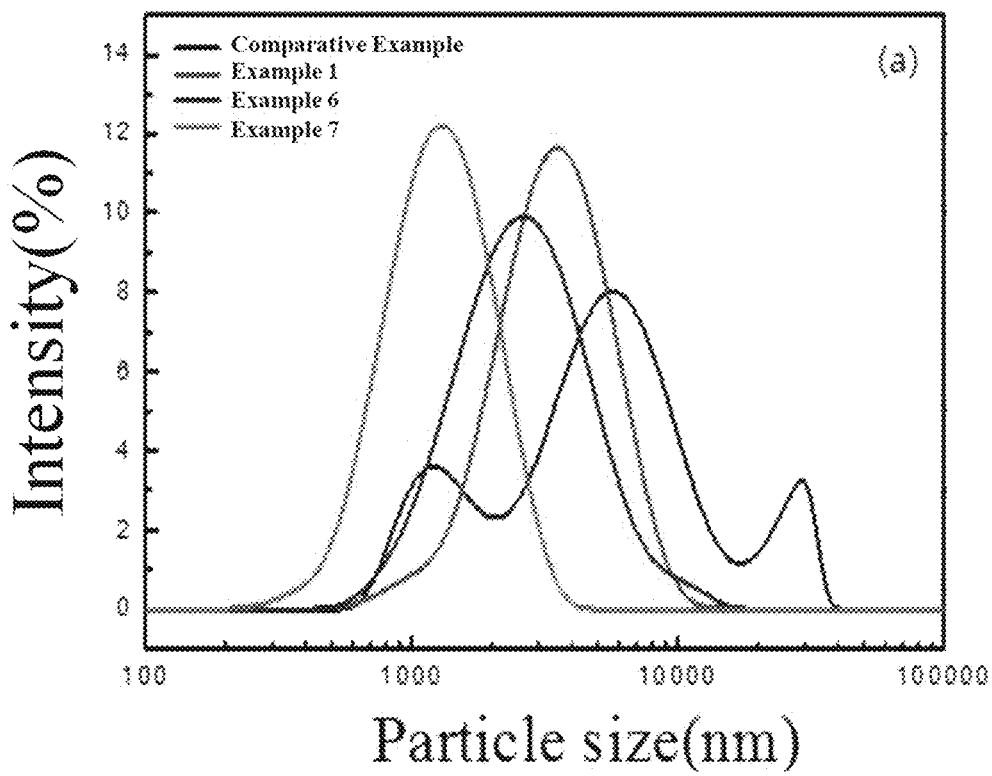
FIGS. 6A and 6B show the results of measuring particle sizes of conductive ceramic compositions according to examples of the present invention and a comparative example.
Figure 6B:
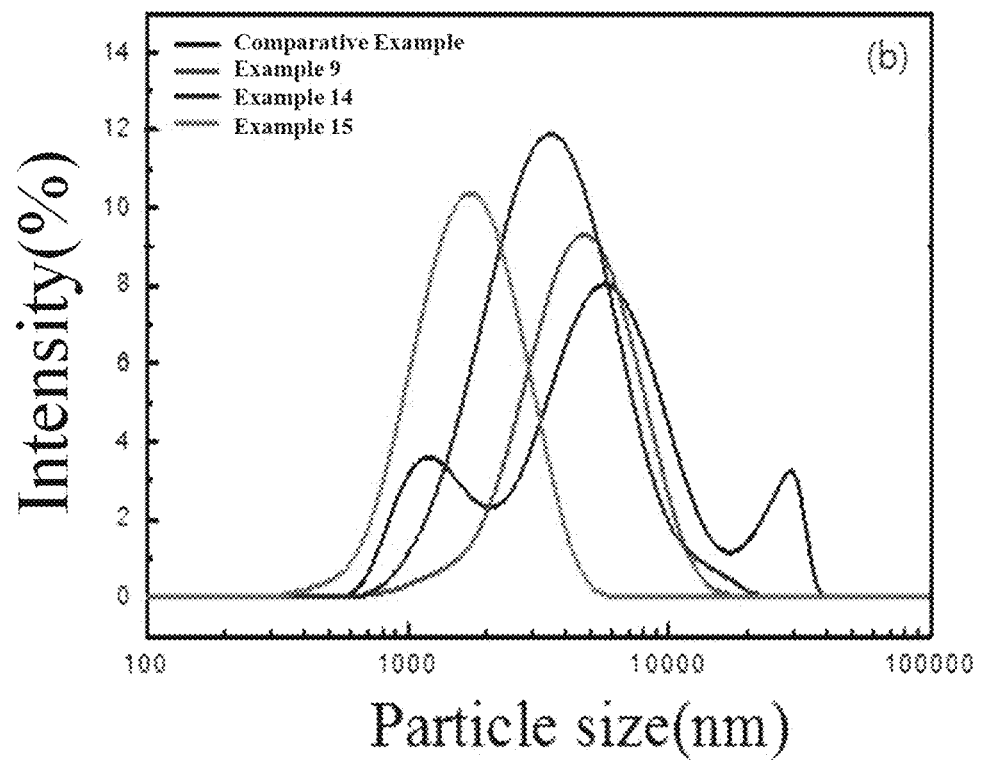

FIGS. 6A and 6B are the result of measuring the average particle sizes of the conductive ceramic compositions obtained according to Comparative Example 1 and the examples. In the case of the comparative example, there are three separated peaks, and it is considered that this is because non-oxide ceramic particles and oxide ceramic particles are not electrostatically bound or co-dispersed. That is, there are three peaks such as a peak of non-oxide ceramic particles, a peak of oxide ceramic particles, and a peak of the aggregation of the particles with a large particle size.

It can be confirmed that, due to electrostatic binding between the non-oxide ceramic particles and oxide particles, which have opposite charges, Examples 1 and 9 have a larger average particle size than Examples 6, 7, 14 and 15 having non-oxide ceramic particles and oxide ceramic particles having the same charges. However, it can be confirmed that a single peak is shown since there is no aggregation between particles.

Figure 7A:
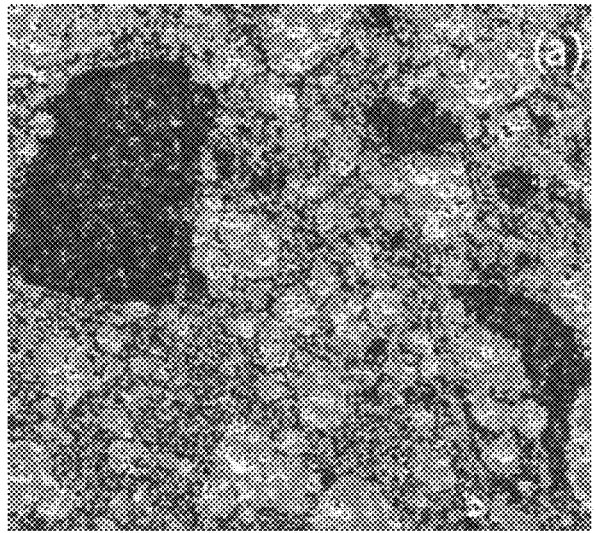
FIGS. 7A-7D show the results of SEM and EDX mapping analyses of conductive ceramic compositions according to examples of the present invention and a comparative example.
Figure 7B:
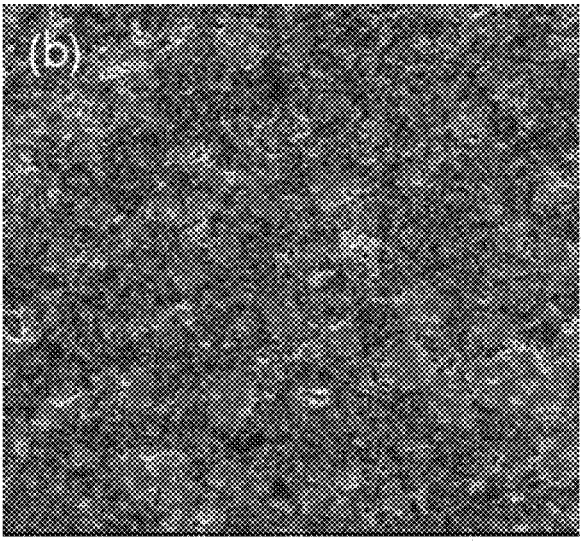
Figure 7C:
Figure 7D:
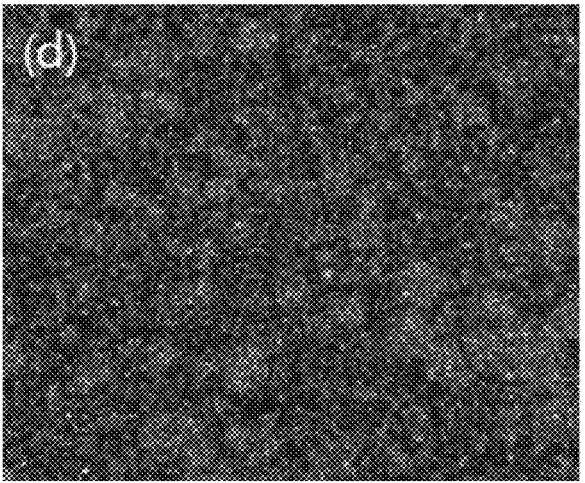

FIGS. 7A and 7B show the results of SEM analysis of Comparative Example 1 and Example 1, respectively, and FIGS. 7C and 7D show the results of EDX mapping of Comparative Example 1 and Example 1, respectively. In the case of the comparative example, the distribution of particles is not uniform, and aggregation is observed, but in the case of the example, it can be confirmed that the distribution of particles is uniform, and a degree of aggregation is lower than that of Comparative Example 1.

Figure 8:
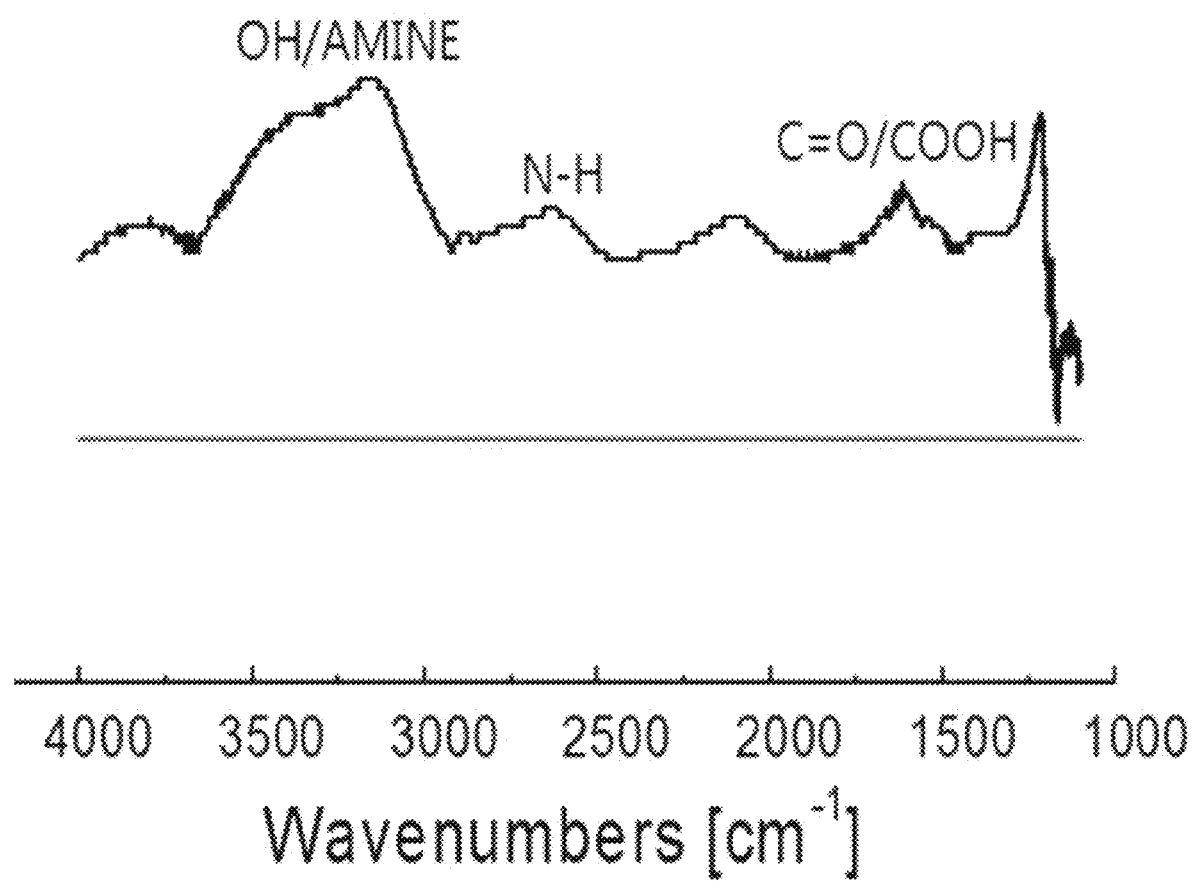
FIG. 8 shows the FT-IR measurement results of a conductive ceramic composition according to an example of the present invention.

FIG. 8 shows the result of Fourier transform infrared spectroscopy (FT-IR) analysis of the conductive ceramic composition of Example 7. It can be confirmed that an amine group of TETA is successively bound at a wave number of approximately 3,400 $cm^{-1}$, and a carboxyl group is successively bound at a wave number of approximately 1,700 $cm^{-1}$.

Figure 9A:
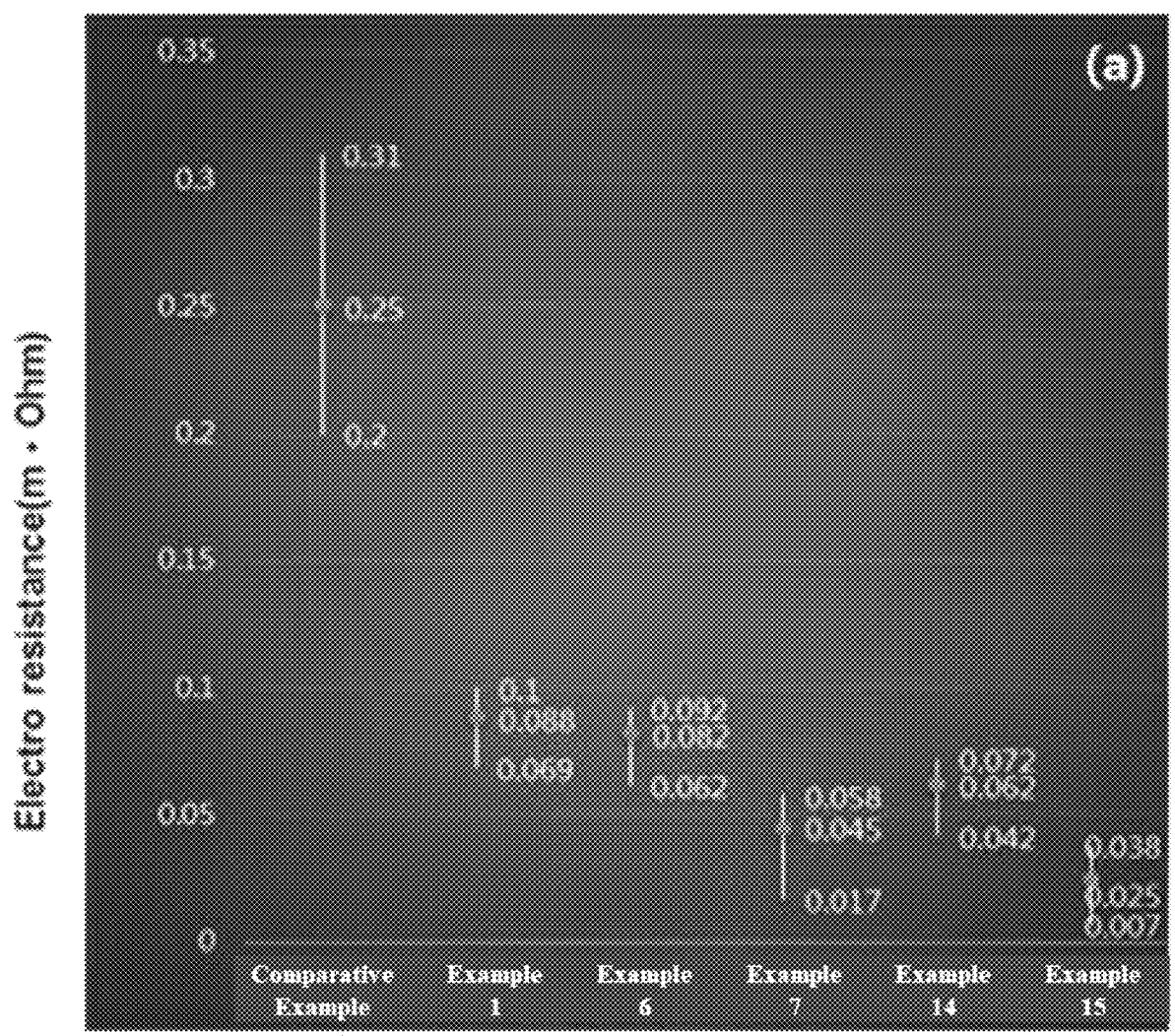
FIGS. 9A and 9B show the results of evaluating the resistance of conductive ceramic compositions according to an example of the present invention and a comparative example.
Figure 9B:
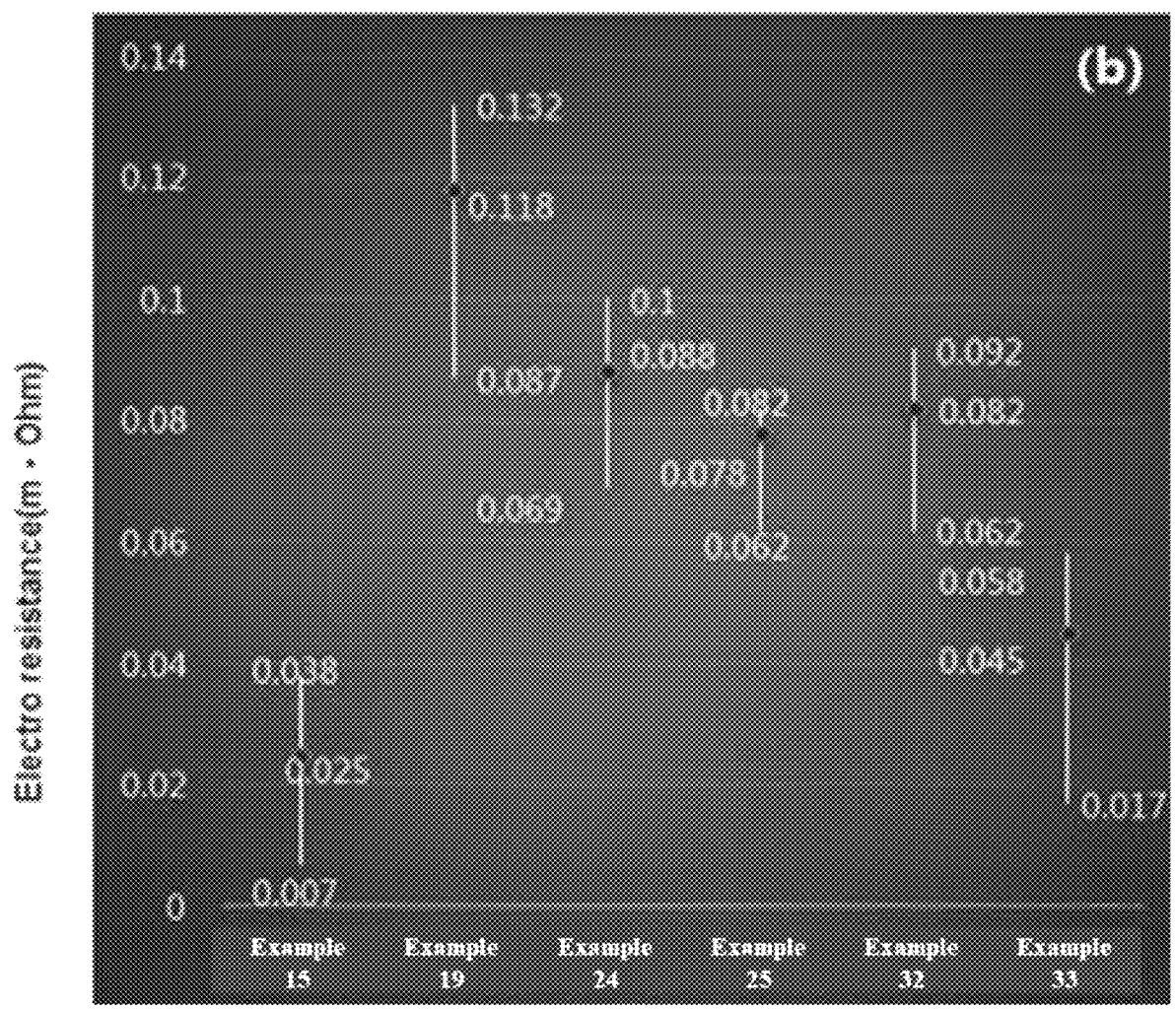

FIGS. 9A and 9B show the results of evaluating resistance for the comparative example and the examples. The conductive ceramic compositions obtained according to the examples, compared to the comparative example, exhibited approximately 2 to 10-fold lower resistances. It is considered that, in the case of Comparative Example 1 using non-oxide ceramic particles and oxide particles, which have not been surface-treated, this result is caused by aggregation between particles and blockage of the electric conductive path by oxide particles exhibiting an insulating property.

In the case of Example 1, the electric conductive path may be induced by binding non-oxide ceramic particles with oxide ceramic particles which are surface-treated to have opposite charges through electrostatic attraction. It can be experimentally confirmed that, as the conductive ceramic composition is uniformly dispersed without being aggregated on a substrate surface, current is induced to the non-oxide ceramic particles without passing through the oxide ceramic particles having an insulating property, thereby lowering resistance.

It can be confirmed that, in Examples 6, 7, 14 and 15, when the composition of non-oxide ceramic particles/oxide ceramic particles is the $ZrB_2/TiO_2$ mixture, compared to the $SiC/SiO_2$ mixture, resistance is slightly lower. In addition, compared to Examples 6 and 14 using the acid-treated non-oxide ceramic particles, Examples 7 and 15 using the TETA-treated non-oxide ceramic particles have low resistances, and it is considered that the electric conductive path between a binder and a conductive ceramic composition was well formed by surface treatment using a material having high affinity with a binder resin.

It can be experimentally confirmed that Examples 19, 24, 25, 32 and 33 exhibit slightly higher resistances than Examples 1, 6, 7, 14 and 15 using non-oxide ceramic particles exhibiting a surface charge, but lower than the comparative example. This is because non-oxide ceramic particles have excellent conductivity, and thus react with oxide ceramic particles exhibiting a charge and a binder resin, thereby forming an electric conductive path.

It can be confirmed that, in Examples 24, 25, 32 and 33, when the composition of non-oxide ceramic particles/oxide ceramic particles is the $ZrB_2/TiO_2$ mixture, compared to the $SiC/SiO_2$ mixture, resistance is slightly lower. In addition, it can be confirmed that Examples 25 and 33 in which oxide ceramic particles and a binder resin exhibit opposite charges exhibit lower resistances than Examples 24 and 32 in which oxide ceramic particles and a binder resin exhibit the same charge. It is considered that this is because an electric conductive path is well formed by the electrostatic attraction between a binder and a conductive ceramic composition.

Figure 10:
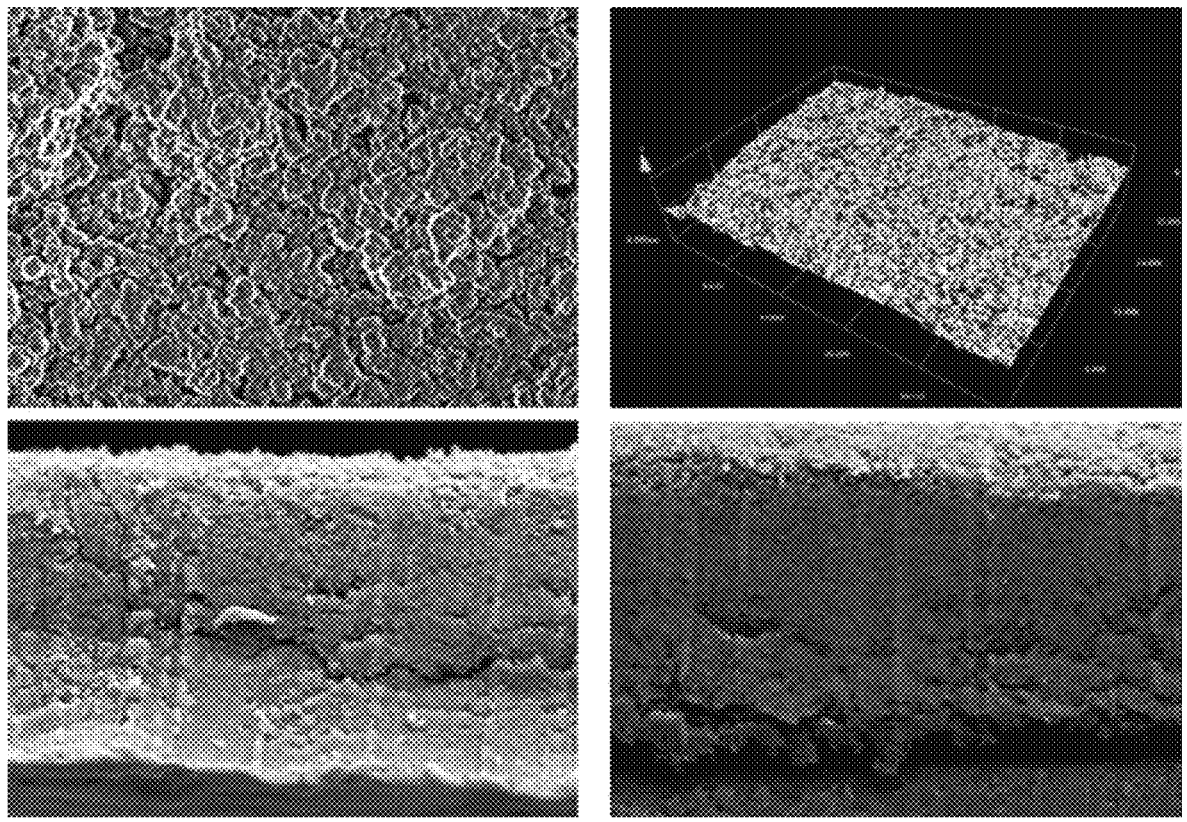
FIG. 10 shows the results of analyzing a conductive ceramic composition according to an example of the present invention prepared in a film shape through SEM and optical microscopy.

FIG. 10 shows the results of SEM analysis and optical microscopy when the conductive ceramic compositions obtained according to the examples of the present invention were applied on a film. It can be confirmed that the conductive ceramic composition is uniformly applied on a substrate.

Figure 11:
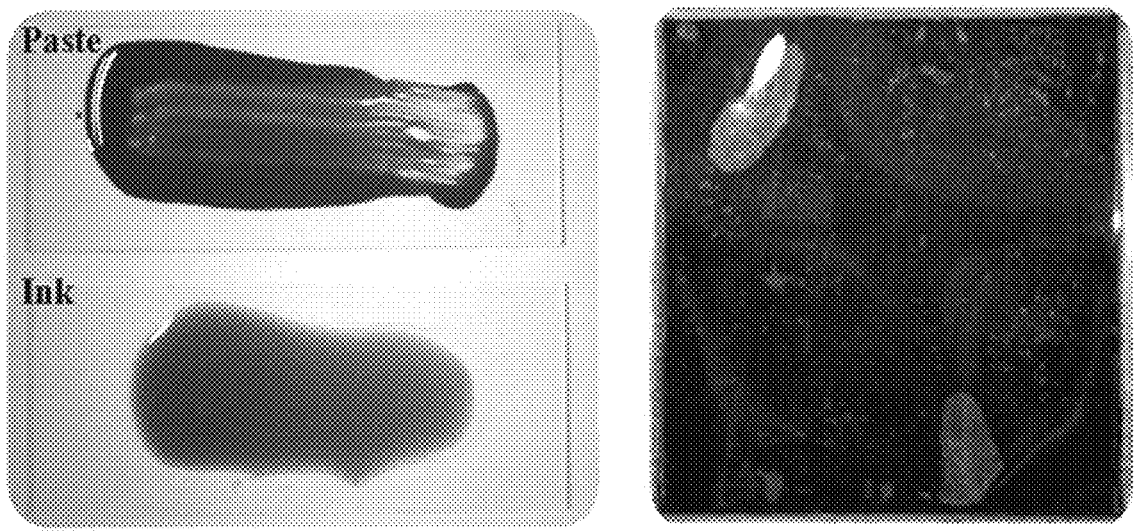
FIG. 11 is a set of optical images showing that a conductive ceramic composition according to an exemplary embodiment of the present invention is prepared in a paste, ink or film type.

FIG. 11 shows an optical image of a paste of the conductive ceramic composition prepared according to Example 18. An ink may be obtained by adjusting the amount of the processing aid of Example 18. When visually confirmed, since the conductive ceramic composition is uniformly distributed in a paste or ink, it can be confirmed that an aggregated mass is not observed, indicating high dispersibility. It can be also seen that the composition is easily processed into a film type.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect. For example, each component described as a single type may be implemented in a dispersed manner, and similarly, components described as dispersed may also be implemented in a combined manner.

The scope of the present invention is defined by the appended claims, and comprehended that all modifications and alterations derived from the meanings and scope of the claims and equivalents thereof are encompassed in the scope of the present invention.

The invention claimed is:

1. A conductive ceramic composition, comprising:
   surface-treated non-oxide ceramic particles that have a charge;
   surface-treated oxide ceramic particles that have an opposite charge to the surface-treated non-oxide ceramic particles; and
   a binder resin,
   wherein, in the binder resin, the surface-treated oxide ceramic particles are bound with the surface-treated non-oxide ceramic particles by electrostatic attraction, such that an electric conductive path is induced by the bound non-oxide ceramic particles and oxide ceramic particles.

2. The conductive ceramic composition of claim 1, wherein the non-oxide ceramic particles include one selected from the group consisting of a metal component, Si, B, C, O, S, P, N and a combination of two or more thereof.

3. The conductive ceramic composition of claim 2, wherein the metal component includes one selected from the group consisting of Sn, Ga, In, Tl, As, Pb, Cd, Ba, Ce, Co, Fe, Gd, La, Mo, Nb, Pr, Sr, Ta, Ti, V, W, Y, Zr, Si, Sc, Ni, Al, Zn, Mg, Li, Ge, Rb, K, Hf, Cr and a combination of two or more thereof.

4. The conductive ceramic composition of claim 1, wherein the surface treatment is chemical surface treatment with one selected from the group consisting of an acid, a base, a halogen element, a silane-based compound, a polymer, a metal ionic material, carbamic acid, a polar solvent, a protic solvent, an aprotic solvent, a non-polar solvent, an electrolyte, a metal salt, a non-metal salt, an amine-based compound, a carboxyl-based compound, a charge control agent, ultraviolet ozone (UVO), and a combination of two or more thereof.

5. The conductive ceramic composition of claim 1, wherein the surface treatment is physical or physicochemical surface treatment with one selected from the group consisting of heat, plasma, ultrasonic waves, milling, and a combination of two or more thereof.

6. The conductive ceramic composition of claim 1, wherein the non-oxide ceramic particles further comprise one selected from the group consisting of a metal flake, a metal rod, metal powder, carbon black, graphene, a carbon nanotube, a fullerene and a combination of two or more thereof.

7. The conductive ceramic composition of claim 1, wherein the non-oxide ceramic particles have a size of 1 to 20,000 nm.

8. The conductive ceramic composition of claim 1, wherein the non-oxide ceramic particles are prepared in a rod shape, a spherical shape, a square shape, a flake shape, and a combination of two or more thereof.

9. The conductive ceramic composition of claim 1, wherein the oxide ceramic particles consist of a metal component and O.

10. The conductive ceramic composition of claim 1, wherein the oxide ceramic particles have a size of 1 to 20,000 nm.

11. The conductive ceramic composition of claim 1, wherein the binder resin includes one selected from the group consisting of an organic binder, an inorganic binder, a cationic polymer, an anionic polymer, a non-ionic polymer, an amphiphilic polymer, and a combination of two or more thereof.

12. The conductive ceramic composition of claim 1, wherein the oxide ceramic particles further comprise one selected from the group consisting of a pigment, a dye, a curing agent, a charge control agent, an electrolyte, a dispersing agent, and a combination of two or more thereof.

13. The conductive ceramic composition of claim 1, wherein the non-oxide ceramic particles comprise boride ceramics.

14. The conductive ceramic composition of claim 1, wherein the non-oxide ceramic particles comprise carbide ceramics.

15. The conductive ceramic composition of claim 1, wherein the non-oxide ceramic particles comprise silicide ceramics.

* * * * *